(12) United States Patent
Howell et al.

(10) Patent No.: US 7,672,954 B2
(45) Date of Patent: *Mar. 2, 2010

(54) METHOD AND APPARATUS FOR CONFIGURING A PLURALITY OF SERVER SYSTEMS INTO GROUPS THAT ARE EACH SEPARATELY ACCESSIBLE BY CLIENT APPLICATIONS

(75) Inventors: Brian K. Howell, San Jose, CA (US); James W. Pickel, Gilroy, CA (US); Hugh J. Smith, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 11/771,410

(22) Filed: Jun. 29, 2007

(65) Prior Publication Data

US 2007/0288491 A1    Dec. 13, 2007

Related U.S. Application Data

(63) Continuation of application No. 10/903,665, filed on Jul. 29, 2004, now Pat. No. 7,299,231.

(51) Int. Cl.
*G06F 17/30* (2006.01)
(52) U.S. Cl. .................................. 707/10; 707/200
(58) Field of Classification Search .................. 707/10, 707/104.1, 200; 709/203, 238
See application file for complete search history.

(56) References Cited

U.S. PATENT DOCUMENTS

| 6,230,183 | B1 | 5/2001 | Yocom et al. |
| 6,427,163 | B1 | 7/2002 | Arendt et al. |
| 6,523,036 | B1 | 2/2003 | Hickman et al. |
| 6,704,768 | B1* | 3/2004 | Zombek et al. ............. 709/201 |
| 6,711,606 | B1 | 3/2004 | Leymann et al. |
| 2001/0034752 | A1 | 10/2001 | Kremien |
| 2001/0039585 | A1 | 11/2001 | Primak et al. |
| 2002/0059423 | A1 | 5/2002 | Leymann et al. |
| 2002/0152307 | A1 | 10/2002 | Doyle et al. |
| 2002/0156931 | A1 | 10/2002 | Riedel |
| 2003/0065711 | A1 | 4/2003 | Acharya et al. |
| 2003/0120782 | A1* | 6/2003 | Bortoloso et al. ........... 709/227 |
| 2003/0204647 | A1 | 10/2003 | Jacobs et al. |
| 2003/0220998 | A1 | 11/2003 | Jennings, III et al. |
| 2004/0030739 | A1 | 2/2004 | Yousefi'zadeh |

* cited by examiner

*Primary Examiner*—Cheryl Lewis
(74) *Attorney, Agent, or Firm*—Sawyer Law Group, P.C.

(57) ABSTRACT

A method and apparatus for configuring a plurality of server systems. In one implementation, the method includes configuring the plurality of server systems as a first database having a group name and a group port, and configuring a subset of the plurality of server systems as a second database having a subset name and a subset port. The first database is accessible by a client application via the group name and the group port for storage of data in the first database, and the second database is accessible by a client application via the subset name and the subset group for storage of data in the second database.

14 Claims, 4 Drawing Sheets

METHOD AND APPARATUS FOR CONFIGURING A PLURALITY OF SERVER SYSTEMS INTO GROUPS THAT ARE EACH SEPARATELY ACCESSIBLE BY CLIENT APPLICATIONS

CROSS REFERENCE TO RELATED APPLICATIONS

This application is a continuation of application Ser. No. 10/903,665, now U.S. Pat. No. 7,299,231 filed Jul. 29, 2004, the entire contents of which are incorporated by reference herein.

FIELD OF THE INVENTION

The present invention relates to server systems, and more particularly to the subsetting of a cluster of server systems.

BACKGROUND OF THE INVENTION

Many techniques exist to "cluster" systems of servers for databases, web applications, etc., where the group of server systems is treated as a single entity. FIG. 1 illustrates a conventional group of server systems representing a single entity. A plurality of server systems $103.1\text{-}103.n$ is configured as a single group 101. From the perspective of a client 102, the group 101 of servers constitutes a single database or entity. When the client 102 wants to connect to one of the server systems $103.1\text{-}103.n$ of the group 101, any of the server systems $103.1\text{-}103.n$ are candidates for the client connection.

Occasionally, users of such systems wish to be able to automatically target a subset of the server systems $103.1\text{-}103.n$ so that only those server systems are affected by a particular set of client application requests. In one conventional solution, the client 102 requests a TCP/IP address for the server systems in the subset from a domain name server (DNS) (not shown). The DNS would be set up with lists that provide the server system TCP/IP addresses for a particular name, through which the subset of server systems can be accessed.

However, this solution has several drawbacks. First, for a typical DNS, the TCP/IP addresses of the server systems $103.1\text{-}103.n$ are given out to the client 102 in a round-robin manner without regard to whether or not the particular server system at the address is available and/or the server system has the capability to handle the client application's request. Second, once connected to the particular server system, the connection remains with that server system until a request to disconnect is received, without regard to whether or not the server system had the capacity to continue processing the client application's requests. This solution assumes that the client 102 disregards any server capacity feedback mechanisms. Third, if the client 102 did utilize the server capacity feedback mechanisms for workload balancing, the only information being returned from the server system would be capacity information for the group 101 as a whole, not just the subset of server systems. Eventually, requests would be sent to all server systems $103.1\text{-}103.n$ in the group 101.

In another solution, each server system of a subset would be defined with a unique "target" name that would be different from the name of the group 101, and probably have different TCP/IP access port numbers as well. This would permit the server feedback mechanisms to only report on the server systems of the subset. However, when a client application wants to access any or all of the server systems $103.1\text{-}103.n$ of the group 101, since there is no longer a common name for all of the server systems $103.1\text{-}103.n$, there is no way for the client application to be able to get to any and all of the server systems $103.1\text{-}103.n$ in the group 101, unless the client application itself manages this aspect of the connection. In addition, any one server system can only participate in one and only one subset.

In both solutions, the sharing of data between the server systems in the group 101 is always a requirement whether a subset of the group of servers or the group as a whole is to be accessed.

BRIEF SUMMARY OF THE INVENTION

In general, in one aspect, this specification describes a method and apparatus for configuring a plurality of server systems. In one implementation, the method includes configuring the plurality of server systems as a first database having a group name and a group port, and configuring a subset of the plurality of server systems as a second database having a subset name and a subset port. The first database is accessible by a client application via the group name and the group port for storage of data in the first database, and the second database is accessible by a client application via the subset name and the subset group for storage of data in the second database.

The details of one or more implementations are set forth in the accompanying drawings and the description below. Features and advantages will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

The present invention provides an improved method and system of subsetting a group of server systems. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
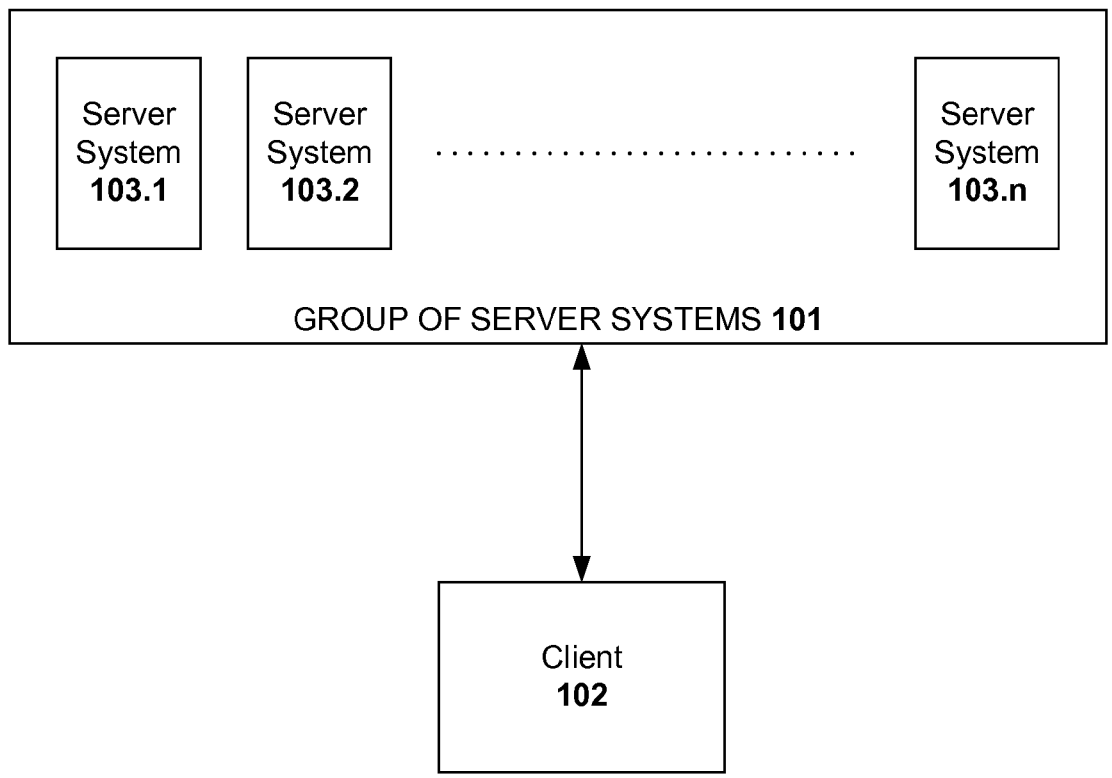
FIG. 1 illustrates a conventional group of server systems representing a single entity.
Figure 2:
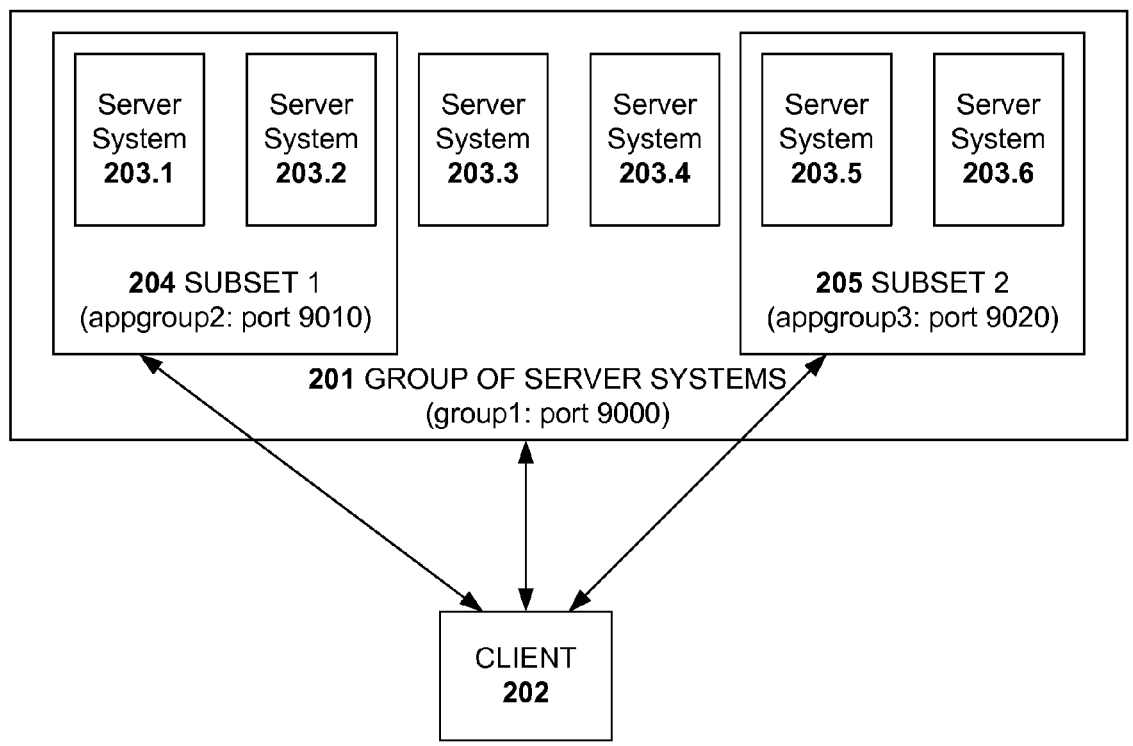
FIG. 2 illustrates a group of server systems in accordance with one implementation.

FIG. 2 illustrates one implementation of a subsetting of a group of server systems. A plurality of server systems $203.1\text{-}203.6$ is configured as being part of a group or cluster 201, with a group name and a group port. Although six server systems are illustrated, any number of server systems can be used. In addition to being defined as a part of the group 201, each server system $203.1\text{-}203.6$ can also be defined as part of one or more subsets, with each subset having a subset name and a subset port. For example, assume that the server systems $203.1\text{-}203.6$ are defined as part of the group 201 named "group1" with port "9000". In addition, servers systems 203.1 and 203.2 are defined as being part of a first subset 204 named "appgroup2" with port "9010". The same is true for servers systems 203.5 and 203.6, which are defined as being part of a second subset 205 named "appgroup3" with port "9020", as well as being part of "group1" 201. In this manner, server systems can be targeted via its subset name and subset port, while also accessible via the common name and port for the group 201. Work can be targeted to certain subsetted server systems, while the direct sharing of data between the server systems 203.1-203.6 of the group 201 is maintained.

Figure 3:
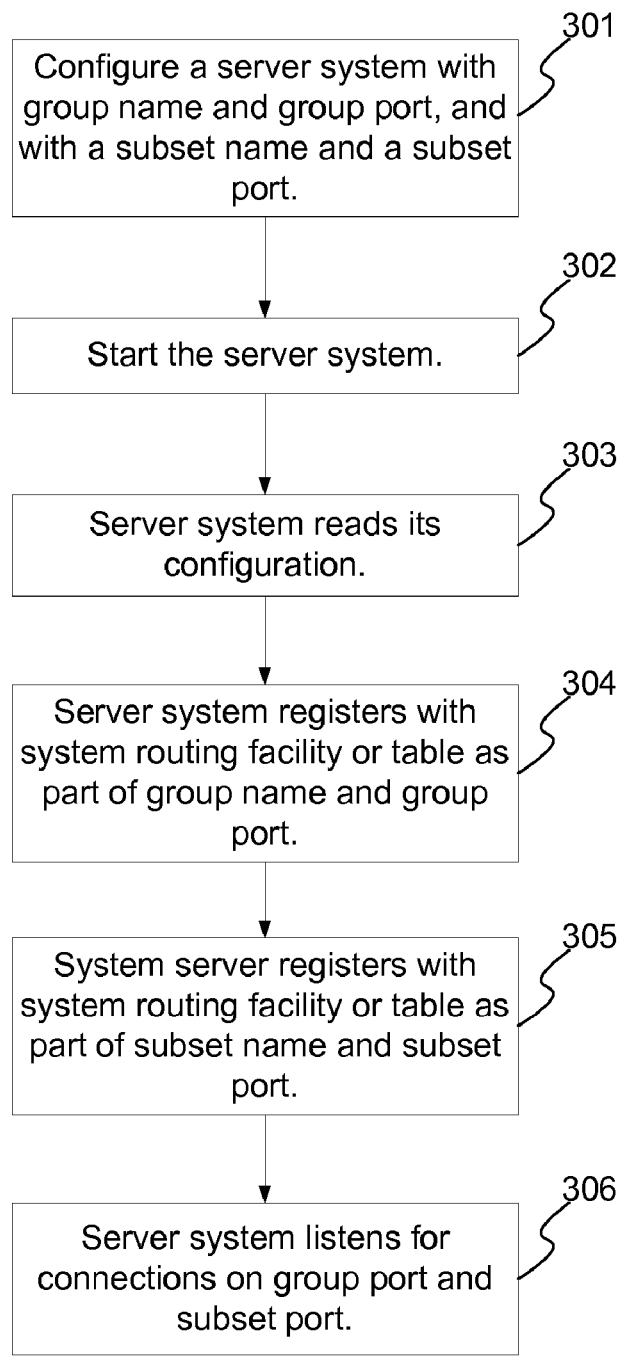
FIG. 3 is a flowchart illustrating activation of subsetting a group of server systems in accordance with one implementation.

FIG. 3 is a flowchart illustrating one implementation of the activation of subsetting a group of server systems. First, a server system is configured with a group name and a group port, and with a subset name and a subset port, via step 301. Next, the server system is started, via step 302. The server system reads its configuration, via step 303. It then registers with a system routing facility or table (not shown) as being part of the group name and the group port, via step 304. The server system also registers with the system routing facility or table as part of the subset name and the subset port, via step 305. The server system then listens for connections on both the group port and the subset port, via step 306.

For example, the server system 203.1 is configured with the group name "group1" and the group port "9000", and with the subset name "appgroup2" and a subset port "9010", via step 301. When the server system 203.1 is started, via step 302, the server system 203.1 reads its configuration, via step 303. The server system 203.1 then registers with the system routing facility or table as part of the "group1" group 201 with port "9000", via step 304. The server system 203.1 also registers with the system routing facility or table as part of the "appgroup2" subset 204 with port "9010", via step 305. Once registered, the server system 203.1 listens for connections on ports 9000 and 9010, via step 306.

Figure 4:
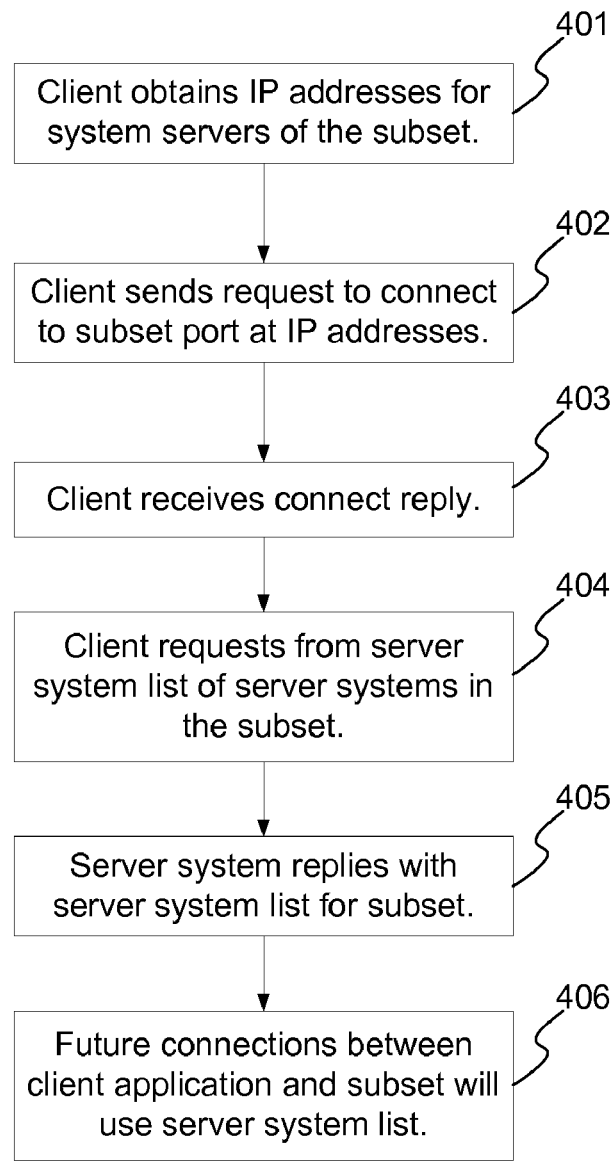
FIG. 4 is a flowchart illustrating a method for establishing an initial connection with a server system of a subset in a group of server systems in accordance with one implementation.

Once the group and its subsets are activated, a client application can connect to any of the server systems 203.1-203.6 as part of the group 201, or target a connection to a server system as part of a subset. FIG. 4 is a flowchart illustrating a method for establishing an initial connection with a server system of a subset in a group of server systems in accordance with one implementation. First, the client 202 obtains the IP addresses for the system servers of the subset, via step 401. For example, a domain name server (DNS) (not shown) can be used to maintain these IP addresses. The client 202 then sends a request to connect to the subset port at the IP addresses, via step 402. When the client 202 receives a connect reply from one of the server systems, via step 403, the client 202 requests from the server system a list of server systems in the subset, via step 404. In this implementation, the server system to which the client 202 is connected asks for this list from the system routing facility or table, and replies to the client 202 with the list, via step 405. Future connections between the client application and the subset will then be obtained using this server system list, via step 406.

For example, assume that client 202 wishes to send a request for an application whose work is to be performed by the "appgroup2" subset 204. The client 202 first obtains the IP addresses for the system servers of the "appgroup2" subset 204, via step 401. Assume that here, the DNS maintains these IP addresses, and that the IP address for server system 203.1 is "IP1", and the IP address for server system 203.2 is "IP2". "IP1" and "IP2" are thus returned to the client 202 from the DNS. The client 202 then sends a request to connect to port "9010" at "IP1" or "IP2". If the client 202 does not receive a connect reply from "IP1" (or "IP2"), it sends the request to "IP2" (or "IP1"). Assume that the client 202 receives a connect reply from "IP1", via step 403, connecting it to the server system 203.1. The client 202 then requests from server system 203.1 a list of server systems in the subset 204, via step 404. The server system 203.1 returns to the client 202 a list that contains itself and server system 203.2, via step 405. Future connections between the client 202 and the subset 204 will use this server list, via step 406.

For another example, assume that client 202 wishes to send a request for an application whose work is to be performed by the "appgroup3" subset 205. The client 202 first obtains the IP addresses for the system servers of the "appgroup3" subset 205, via step 401. Assume that here, the DNS maintains these IP addresses, and that the IP address for server system 203.5 is "IP5", and the IP address for server system 203.6 is "IP6". "IP5" and "IP6" are thus returned to the client 202 from the DNS. The client 202 then sends a request to connect to port "9020" at "IP5" or "IP6". If the client 202 does not receive a connect reply from "IP5" (or "IP6"), it sends the request to "IP6" (or "IP5"). Assume that the client 202 receives a connect reply from "IP6", via step 403, connecting it to the server system 203.6. The client 202 then requests from server system 203.6 a list of server systems in the subset 205, via step 404. The server system 203.6 returns to the client 202 a list that contains itself and server system 203.5, via step 405. Future connections between the client 202 and the subset 205 will use this server list, via step 406.

Although the above implementation is described with a DNS, other means of routing the connection is possible. For example, if the group 201 has one IP address, a distributing router can be used to route the connection request to a particular subset of server systems based on the targeted port.

If the infrastructure of the group 201 supports workload balancing/routing, this feature is available for the subsets 204-205 as well. When a server system is activated, it registers itself with the workload balancer/router using the group name, as well as each subset name to which the server system is configured. When the server system is being accessed via its group name and port, the server system will request from the workload balancer/router the current list of server systems that are active in the group. If the server system is being accessed via one of its subset names and ports, then the server system will request from the workload balancer/router the current list of server systems that are active in the subset. This information is formatted and returned to the client 202. This information can also be server weighted so that the client 202, if made to use such information, can decide to which of the server systems future work is routed. Each time a client requests a new connection, or a reuse of a connection with a new user, an updated server list is returned.

When server systems leave the group, either through reconfiguration of the group or from failure, the information that was registered with the group workload balancer/router and/or request distributor for the server system is deregistered. In the case of abnormal server failures, the failing server system information is removed from the workload balancer/router and/or request distributor. Since the client has the information for available server systems, it can route work to the remaining server systems in the list.

A method and system of subsetting a group of server systems has been disclosed. The method and system configures a server system with a group name and a group port, and with a subset name and a subset port of at least one subset of the server systems in the group. The server system, when activated, reads its configuration and registers with a system routing entity as being part of the group name and the port, and as being part of the subset name and the subset port. In this manner, server systems can be targeted via its subset name and subset port, while also accessible via the common name and port for the group. Work can be targeted to certain subsetted server systems, while direct data sharing between the server systems of the group is maintained. In addition, if the group includes a workload balancer, the server system also registers with the workload balancer using the group name and the subset name. Workload balancing is thus provided for the subset as well as the group.

Modifications can be made to the implementations discussed above and those modifications would be within the scope of the present invention. Accordingly, many modifications may be made without departing from the scope of the appended claims.

What is claimed is:

1. A method for configuring a plurality of server systems, the method comprising:
   configuring the plurality of server systems as a first database having a group name and a group port, including:
      configuring each of the plurality of server systems with the group name and the group port; and
      registering each of the plurality of server systems with a system routing facility as being part of the first database;
   configuring a subset of the plurality of server systems as a second database having a subset name and a subset port, including:
      configuring each server system in the subset with the subset name and the subset port; and
      registering each server system in the subset with the system routing facility as being part of the second database in addition to the first database;
   wherein the first database is accessible by a client application via the group name and the group port for storage of data in the first database, and the second database is accessible by a client application via the subset name and the subset group for storage of data in the second database.

2. The method of claim 1, wherein subsequent connections between the client application and the subset utilize the list.

3. The method of claim 1, further comprising registering each server system in the subset with a workload balancer of the group using both the group name and the subset name.

4. The method of claim 3, further comprising obtaining from the workload balancer a list of server systems active in the first database responsive to a given server system of the plurality of server systems being accessed through the group name and the group port.

5. The method of claim 3, further comprising obtaining from the workload balancer a list of servers active in the second database responsive to a given server system in the subset being accessed through the subset name and the subset port.

6. A computer readable medium encoded with a computer program for configuring a plurality of server systems, the computer program comprising computer executable instructions for:
   configuring the plurality of server systems as a first database having a group name and a group port, including:
      configuring each of the plurality of server systems with the group name and the group port; and
      registering each of the plurality of server systems with a system routing facility as being part of the first database;
   configuring a subset of the plurality of server systems as a second database having a subset name and a subset port, including:
      configuring each server system in the subset with the subset name and the subset port; and
      registering each server system in the subset with the system routing facility as being part of the second database in addition to the first database;
   wherein the first database is accessible by a client application via the group name and the group port for storage of data in the first database, and the second database is accessible by a client application via the subset name and the subset group for storage of data in the second database.

7. The computer readable medium of claim 6, wherein subsequent connections between the client application and the subset utilize the list.

8. The computer readable medium of claim 6, wherein the computer program further comprises computer executable instructions for registering each server system with a workload balancer of the group using both the group name and the subset name.

9. The computer readable medium of claim 8, wherein the computer program further comprises computer executable code for obtaining from the workload balancer a list of server systems active in the first database responsive to a given server system of the plurality of server systems being is accessed through the group name and the group port.

10. The computer readable medium of claim 8, wherein the computer program further comprises computer executable code for obtaining from the workload balancer a list of server systems active in the first database responsive to a given server system in the subset being accessed through the subset name and the subset port.

11. A system comprising:
    a system routing facility; and
    a plurality of server systems,
    wherein the plurality of server systems is configured as a first database having a group name and a group port and is registered with the system routing facility as being part of the first database,
    wherein a subset of the plurality of server systems is configured as a second database having a subset name and a subset port and is registered with the system routing facility as being part of the second database, and
    wherein the first database is accessible by a client application via the group name and the group port for storage of data in the first database, and the second database is accessible by a client application via the subset name and the subset group for storage of data in the second database.

12. The system of claim 11, further comprising a workload balancer, wherein each server system in the subset registers with the workload balancer using both the group name and the subset name.

13. The system of claim 12, wherein when a given server system of the plurality of server systems is accessed via the group name and the group port, the server system obtains from the workload balancer a list of server systems active in the first database.

14. The system of claim 12, wherein when a given server system in the subset is accessed through the subset name and the subset port, the server system obtains from the workload balancer a list of server systems active in the second database.

* * * * *